(12) United States Patent
Aisaka et al.

(10) Patent No.: US 7,000,072 B1
(45) Date of Patent: Feb. 14, 2006

(54) CACHE MEMORY ALLOCATION METHOD

(75) Inventors: Kazuo Aisaka, Kokubunji (JP); Keisuke Toyama, Hodogaya (JP)

(73) Assignee: Hitachi, Ltd., Tokyo (JP)

( * ) Notice: Subject to any disclaimer, the term of this patent is extended or adjusted under 35 U.S.C. 154(b) by 856 days.

(21) Appl. No.: 09/688,360

(22) Filed: Oct. 12, 2000

(30) Foreign Application Priority Data

Oct. 14, 1999 (JP) ................................. 11-291807

(51) Int. Cl.
*G06F 12/00* (2006.01)

(52) U.S. Cl. ................ 711/118; 711/130; 711/133; 711/136; 711/159; 711/165; 711/166; 707/205

(58) Field of Classification Search ............. 711/118, 711/121, 154, 165, 166, 130, 133, 136, 159, 711/170, 3, 147, 150, 151, 158, 171–173, 711/207, 163, 164; 707/205

See application file for complete search history.

(56) References Cited

U.S. PATENT DOCUMENTS

| 4,947,319 A | 8/1990 | Bozman ................... 364/200 |
|---|---|---|
| 5,119,290 A | 6/1992 | Loo et al. ................ 395/400 |
| 5,442,571 A | 8/1995 | Sites ....................... 364/403 |
| 5,581,737 A * | 12/1996 | Dahlen et al. ............ 711/170 |
| 5,630,097 A | 5/1997 | Orbits et al. ............. 395/492 |
| 5,796,971 A | 8/1998 | Emberson ................. 395/383 |
| 6,115,793 A * | 9/2000 | Gruber et al. ............ 711/133 |
| 6,216,199 B1 * | 4/2001 | DeKoning et al. ........... 711/3 |
| 6,408,368 B1 * | 6/2002 | Parady ..................... 711/159 |

* cited by examiner

*Primary Examiner*—Matthew Kim
*Assistant Examiner*—Zhuo H. Li
(74) *Attorney, Agent, or Firm*—Miles & Stockbridge P.C.

(57) ABSTRACT

To assure the multiprocessing performance of CPU on a microprocessor, the invention provides a method of memory mapping for multiple concurrent processes, thus minimizing cache thrashing. An OS maintains a management (mapping) table for controlling the cache occupancy status. When a process is activated, the OS receives from the process the positional information for a specific part (principal part) to be executed most frequently in the process and coordinates addressing of a storage area where the process is loaded by referring to the management table, ensuring that the cache address assigned for the principal part of the process differs from that for any other existing process. Taking cache memory capacity, configuration scheme, and process execution priority into account when executing the above coordination, a computer system is designed such that a highest priority process can have a first priority in using the cache.

13 Claims, 13 Drawing Sheets

FIG. 8a

| PROCESS NO. | PROGRAM NAME | PROGRAM AREA START ADDRESS | PROGRAM AREA END ADDRESS | EXECUTION ENTRY ADDRESS | WORKING STORAGE START ADDRESS | WORKING STORAGE END ADDRESS |
|---|---|---|---|---|---|---|
| 0 | OS | 0 | $1FFFFF | $100000 | $200000 | $2FFFFF |
| 1 | | | | | | |
| 2 | | | | | | |
| 3 | | | | | | |

FIG. 8b

| PROCESS NO. | PC | FLAG STATUS | REGISTER 1 | REGISTER 2 | |
|---|---|---|---|---|---|
| 0 (OS) | | | | | |
| 1 | | | | | |
| 2 | | | | | |
| 3 | | | | | |

FIG. 9a

| CACHE ADDRESS | PROCESS NO. |
|---|---|
| $000-$07F | 0 |
| $080-$0FF | 0 |
| $100-$17F | 1 |
| $180-$1FF | 1 |
| $200-$27F | -1 |
| $280-$2FF | 2 |
| $300-$37F | 2 |
| $380-$3FF | 2 |
| $400-$47F | -1 |
| $480-$4FF | -1 |
| $500-$57F | -1 |
| $580-$5FF | 3 |
| ⋮ | ⋮ |
| $1F00-$1F7F | 4 |
| $1F80-$1FFF | 4 |

FIG. 9b

| CACHE PAGE | PROCESS NO. |
|---|---|
| 0 | 0 |
| 1 | -1 |
| 2 | -1 |
| 3 | -1 |

FIG. 10

| CACHE ADDRESS \ CACHE PAGE | 0 | 1 | 2 | 3 |
|---|---|---|---|---|
| EXCLUSIVE USE OF PAGE | 0 | −1 | −1 | −2 |
| $000-$07F | 0 | 1 | 3 | −1 |
| $080-$0FF | 0 | 1 | 3 | −1 |
| $100-$17F | 0 | 1 | 3 | −1 |
| $180-$1FF | 0 | 1 | −1 | −1 |
| $200-$27F | 0 | −1 | −1 | −1 |
| $280-$2FF | 0 | 2 | 5 | −1 |
| $300-$37F | 0 | 2 | −1 | −1 |
| $380-$3FF | 0 | 2 | −1 | −1 |
| $400-$47F | 0 | −1 | −1 | −1 |
| $700-$77F | 0 | 4 |  | −1 |
| $780-$7FF | 0 | 4 |  | −1 |

FIG. 11a

| KIND OF ATTRIBUTE | VALUE |
|---|---|
| PROGRAM NAME | | 
| PROGRAM SIZE | |
| ENTRY ADDRESS | |
| ADDRESS OF PRINCIPAL PART | |
| SIZE OF PRINCIPAL PART | |

FIG. 11b

| KIND OF ATTRIBUTE | VALUE |
|---|---|
| PROGRAM NAME | |
| PROGRAM SIZE | |
| ENTRY ADDRESS | |

FIG. 11c

| KIND OF ATTRIBUTE | VALUE |
|---|---|
| PROGRAM NAME | |
| PROGRAM SIZE | |
| ENTRY ADDRESS | |
| ADDRESS OF PRINCIPAL PART | |
| SIZE OF PRINCIPAL PART | |
| REQUIRED CACHE PAGES | |

FIG. 11d

| KIND OF ATTRIBUTE | VALUE |
|---|---|
| PROGRAM NAME | |
| PROGRAM SIZE | |
| ENTRY ADDRESS | |
| ADDRESS OF PRINCIPAL PART | |
| SIZE OF PRINCIPAL PART | |
| EXECUTION PRIORITY | |

CACHE MEMORY ALLOCATION METHOD

FIELD OF THE INVENTION

The present invention relates to a method of allocating a cache memory included in a computer system, and moreover relates to an operating system having the capability of cache memory allocation and a computer system operating under the control of such operating system.

BACKGROUND OF THE INVENTION

With the advance of microprocessor hardware, it is now required that software operating on the hardware has more advanced capabilities correspondingly. As one of such capabilities, a "multiprocessing capability" for concurrent running of a plurality of software units on a single microprocessor unit is required even for small information processing devices such as personal computers.

As software for implementing the above capability, an operating system (OS) is prepared to take a duty of putting multiple running processes in order: the OS loads multiple processes in position into storage space and runs them in turn in a time-sharing manner. One of the roles of the OS is allocating resources such as storage domains, I/O channels, and CPU time required to run all processes. If a conflict (contention) between one process and another process to use such resources occurs, the OS coordinates these processes by using a suitable method.

Another aspect of the advance of microprocessors is further increased processing speed. The most advanced microprocessors in current use have greater performance than large computers of about 15 years ago and image processing can be implemented by using a microprocessor, though it was impossible at that time.

Hardware technology for increasing the processing speed, of course, means increasing the processing rate of the circuit elements used in the processors. In addition, a technique of increasing the average processing rate of the hardware by using a cache memory is widely used.

A cache memory is a faster-access memory of small capacity to be used in addition to ordinary storage (main storage memory or simply, main storage). Access time for read/write of the cache memory is about five to ten times as fast as that of the main storage. On the other hand, the capacity of the main storage memory is 16 M to 64 M bytes for current standard personal computers, whereas the capacity of the cache memory is as small as 8 K to 32 K bytes.

When a CPU of a personal computer runs a program, the cache memory is used as follows.

Immediately after the power supply is turned on, the cache memory is empty. When program execution starts, the CPU reads instructions in the program one by one from the main storage and interprets and executes them, during which the read instructions are concurrently copied to the cache memory. If the cache memory becomes full, a suitable one of the previously copied instructions is erased and a new instruction is copied in place, in other words, overwrite is performed.

As far as the process described above be concerned, the use of the cache memory does not increase the processing speed. However, iteration of processing occurs during the execution of most programs, that is, a previously executed part of a program is executed again. When this happens, the CPU reads the copied instruction from the cache memory instead of accessing the main storage. As a result, the reading can be completed at a rate of five to ten times as fast as the rate of accessing the main storage. This effect becomes greater as the number of times of iteration occurring becomes larger.

In most fields of computer program application, relatively simple processing is often iterated many times during program execution. For example, in a computer graphic program, processing in which "brightness of a given point on the screen is determined by a specific equation" is iterated for all points on the screen. In an accounting program, processing of "totaling the amounts of money in a slip" is iterated for all slips. The nature of programs that concentrated iteration of a specific part of a program occurs as in the above examples is called "localized servicing" and it is known that most programs have this nature.

To effectively take advantage of the cache memory that contributes toward increasing the access speed for reading a program, it is necessary to copy an iterative part of the program to the cache memory and provide the cache memory with storage capacity at least for storing the iterative part. In practical computers, the cache memory capacity is determined so as to satisfy the above necessity in the order of 8 K to 32 K bytes for a microprocessors that is used as the CPU of a personal computer.

When the CPU reads a program instruction as described above, it must judge whether the instruction has been copied to the cache memory (a hit on the cache) or not (amiss on the cache). Conventionally, this is often carried out by a method that will be described below.

Because the cache memory is a kind of storage, addresses are assigned to memory units (bytes). If the cache memory capacity is, for example, 8 K bytes (213 bytes, where symbol  denotes exponentiation), each byte is assigned a 13-bit address in a range of binary digits from "0000000000000" to "1111111111111." On the other hand, addresses are assigned to main storage locations in the same way. If the main storage capacity is, for example, 32 M bytes (2**25 bytes), each byte is assigned a 25-bit address.

When the CPU copies an instruction to the cache memory, address signal lines of the main storage are used as is to determine the corresponding address in the cache memory. However, the cache memory capacity is smaller (the number of address signal lines is smaller), only the corresponding positions of the signal lines from the least significant bit (LSB) are used. For the memory of the above-mentioned capacity, an instruction stored at a main storage address, for example:

A=A24 A23 A22 . . . A13 A12 A11 . . . A2 A1 A0

(where each An contains a value of 0 or 1) is copied to a cache memory address:

A=A12 A11 . . . A2 A1 A0

This is expressed as a relation:

$$A = A \bmod(2^{**}13) \text{ where mod denotes arithmetic giving modulo.} \quad \text{[Equation 1]}$$

In this method, any given main storage address A is converted into the corresponding cache memory address A' that is unique.

Only from the cache memory address A', even if being given solely, the corresponding main storage address from where the contents of the bits of the address A' have been copied cannot be determined because the bit positions A24 to A13 of the main storage address A from the most significant bit are unknown. Therefore, when an instruction is copied to the cache memory, the upper positions of the above address A:

$$At = A_{24}A_{23}A_{22} \ldots A_{13}$$

are stored in the cache memory address A' together with the instruction. For this purpose, the cache memory is provided with auxiliary memory space for 12 bits (=25−13) per byte. The above At portion is called a "tag" to the main storage address A.

A cache memory configuration discussed above is the simplest, but it is not effective because a 12-bit tag must be stored simultaneously for storing a 1-byte (8 bits) instruction in this configuration. As a modification to the above configuration, a line-configuration cache memory is prevailing. A line is a cache memory unit consisting of a plurality of bytes that are serial (for example, four bytes). Instruction copy and judgment of a hit/miss on the cache are executed on a line-by-line basis. In the line-configuration cache, a tag is stored for each line and therefore memory space can be saved. An address is assigned to each line and this address is called an entry address (or simply an entry) which differs from an ordinary address in meaning.

The same characteristics of cache memory as described above also apply to the line-configuration cache memory: i.e., the relation between a main storage address and the corresponding cache memory address (address per byte, not the entry address) is determined by [equation 1]; and the localized servicing of programs is a precondition for effective use of the cache memory.

Of course, not only instructions in a program but also data to be processed by a program may be copied to the cache memory without trouble.

As described above, the cache memory contributes toward enhancing the performance of a computer. Recently, it has been revealed that the cache memory, however, does not always function effectively in some case when the computer is used for multiprocessing.

The cache memory, as described in the previous section, is a performance-enhancing method applied on the assumption that programs (and data) are of localized servicing. On the other hand, multiprocessing is a time-sharing processing method for concurrent running of multiple programs. During the multiprocessing, thus, the CPU control for processing transfers to a different independent program after the elapse of a given period. Essentially, this has an adverse effect on the cache memory operation taking advantage of the localized servicing of programs. In fact, the cache memory is of no effect because, immediately after the transfer, the cache memory retains the contents of a program copied before the transfer and the CPU must read another program to which the control was transferred from the main storage. Thereafter, the cache memory would work effectively if iterative processing occurs (it is assumed that an individual program to be used is of localized servicing, causing a sufficient number of times of iterative processing). However, this is effective only before the next transfer of control occurs.

The occurrence of the above fact is particularly significant when the unit time (a time slice) of time sharing for multiprocessing is so short that iterative processing of a program is only possible by a limited number of times (five times, more or less) during the time slice. In this case, even if the access speed of the cache memory is ten times as fast as that of the main storage, the access speed for a complete time slice only increases by about three and a half times because the first time access must be performed to the main storage. As compared with a case where iterative processing occurs a sufficient number of times and the access speed increases by about ten times, the short time slice causes the access speed to decrease by about one third.

The above phenomenon of performance decrease due to frequent occurrence of cache memory overwrite is called thrashing. To avoid thrashing, some measures for improvement have been proposed as will be described below, but any of these measures apparently have not produced a sufficient effect so far.

As a first measure for improvement, a method has been proposed in which the access to cache memory is granted to only a specific process (having execution priority) and other processes' instructions are not copied to the cache memory. In this method, the priority process can use the cache memory to advantage in the same way as a single process runs on the computer. However, this forces the CPU to run other processes at low performance without the cache memory.

As a second measure for improvement, a method has been proposed in which parallel cache memory units are provided to prevent contention between processes to use the cache. Specifically, a plurality of cache memory units (for example, two units) are installed on the computer system and instructions are copied to one of them that is empty. Judgment of a hit/miss on the cache, which is assumed two units, is performed as follows. After an entry address is generated from the main storage address, the tag stored with the entry address is compared with the corresponding upper bits of the main storage address in both cache units. If there is a match between the tag and the upper bits in either unit, the contents copied and stored in the entry address in the cache unit are used. If the match is not detected in both cache units, the judgement is a miss on the cache, when it is necessary to access the main storage.

This method can avoid thrashing if the number of processes is equal to or less than the number of cache units. If, however, the number of processes is greater than the number of cache units, thrashing occurs as described above. In recent personal computer application, many processes (five or more) are executed simultaneously and there are many cases where each process is further divided into a plurality of sub-processes (threads), and consequently it is difficult to install a sufficient number of cache memory units on the computer so that these processes can be executed without contention. Even if a sufficient number of cache units are provided, a complexity of control circuits is required to control parallel operation of these units. To implement, for example, the above judgment of a hit/miss on the cache, after the comparison between a tag and the corresponding upper bits of main storage address is executed for all cache units, a function of selecting a specific unit, according to the result of the comparison, is required. Especially for a miss on the cache, complicated calculation (LRU-algorithm) is required to determine a cache unit into which the instruction read from the main storage is overwritten and the processing time increases. Consequently, the thus increased processing time cancels out faster access that is a feature of the cache memory and the second method application to this case is not considered practical. CPUs that are now widely used for personal computers employ four cache units (called four ways) to eight cache units, the upper limit.

An object of the present invention is to provide a method of using the cache memory such that thrashing can be avoided with minimized hardware expansion, improving cache operation under the above circumstances.

Other objects of the present invention will be elucidated by the whole text of the present specification and the related drawings.

SUMMARY OF THE INVENTION

Typical implementations of the invention disclosed herein will be summarized below.

Allocation of resources available on a computer system to run a plurality of program units is carried out by the following in combination: a step of receiving a request for running a program unit; a step of obtaining parameters that represent the attributes of the program unit; a step of allocating resources required to run the program unit, based on a resource allocation table and a cache management table as well as the above parameters; a step of registering results of allocating resources into the resource allocation table; and a step of registering an allocated storage domain of a cache memory to be used for the program unit into the cache management table.

Furthermore, specifically, the above parameters give positional information for a principal part to be executed at a high frequency in the program unit, the above resource allocation table has address reference information 5 on a main storage to be used for program units, and the above cache management table lists addresses of the cache memory and program units mapped in cache address domains. The allocation of resources is implemented such that the above step of allocating resources determines an address of area to be used for the program unit in the main storage, ensuring that the principal part of the program unit is assigned an entry address of free cache area, based on the positional information for the principal part, the address reference information, and the cache management table.

When an operating system that is capable of running a plurality of program units concurrently receives a request for running a new program unit, the operating system carries out: obtaining parameters that represent the attributes of the program unit; allocating resources required to run the program unit, based on a resource allocation table and a cache management table as well as the above parameters; registering results of allocating resources into the resource allocation table; and registering an allocated storage domain of a cache memory to be used for the program unit into the cache management table.

More specifically, as concerns the above operating system, if the cache memory has a plurality of pages, the above resource allocation table has address reference information on a main storage to be used for program units, the above cache management table lists pages of the cache memory and program units mapped in cache pages, and the allocation of resources determines an address of area to be used for the program unit in the main storage, based on the positional information for said principal part, the address reference information, and the contents of the cache management table.

A computer system including a cache memory, a CPU, and storage and operating under the control of an operating system stored into the storage, when receiving a request for running a program units, caries out: obtaining parameters that represent the attributes of the program unit; allocating resources required to run the program unit, based on a resource allocation table and a cache management table as well as the above parameters; registering results of allocating resources into the resource allocation table; and registering an allocated storage domain of a cache memory to be used for the program unit into the cache management table.

By configuring a computer system to implement resource (specifically, cache) allocation as described above, the above-mentioned programs can be solved. A major source of thrashing is contention between multiple program units (processes or threads) to use the cache memory. It is apparent that some limitation is placed on avoiding the thrashing by hardware improvements, which have been taken conventionally. Therefore, the present invention offers a solution based on a cooperative system of software and hardware. That is, on the premise that the occurrence of contention for using the cache memory is inevitable as long as there are limitations on hardware expansion, the present invention provides preventive measures against significant thrashing developing by software-related contrivance.

Processing is greatly influenced by a miss on the cache if thrashing occurs when allocating the cache for a program's part (principal part) to be executed at a frequency. However, it is known that the size of the principal part is not so large. The present invention provides a method of coordination of positioning processes (tasks of program units) on the main storage, ensuring that the principal parts of the processes be assigned different cache memory addresses. In fact, this coordination is executed by host software that takes a duty of allocating storage domains and other resources for processes to run, that is, an operating system (OS) or software with equivalent control ability. Application programs operating under the OS give information (parameters) to the OS so that the OS can execute the coordination task. The OS maintains in it the cache management table in addition to the resource allocation table, which has been used conventionally, and executes the coordination by using these tables.

Although the invention described above is effective when being applied independently, the invention is more effective when being combined with thrashing preventive measures provided for the hardware (such as dividing the cache memory into pages).

BRIEF DESCRIPTION OF THE DRAWINGS

Other objects and advantages of the invention will become apparent during the following discussion of the accompanying drawings, wherein:

FIG. 8 shows the forms of a resource allocation table and a status retention table that are used by the OS to execute management of multiple concurrent processes;

FIG. 9 shows two forms of a cache management table; one for the first embodiment of the present invention and the other for a second or third embodiment of the invention;

FIG. 10 shows a form of the cache management table appropriate for a combination of the first embodiment and the second or third embodiment;

FIG. 11 shows forms of attribute information appropriate for the first embodiment of the present invention and the second or third embodiment of the invention;

DETAILED DESCRIPTION OF THE PREFERRED EMBODIMENTS

Preferred embodiments of the present invention will be explained below with reference to the drawings.

First, the overall structure of a computer system on which the present invention is to be implemented will be explained by using FIG. 2.

A computer system 10000 is configured in hardware with a CPU 1000 using a microprocessor, a ROM 1001, and a RAM 1002 that are interconnected by a bus 1003. In addition, an I/O channel 1004 is connected to the bus 1003, and through it, the following are connected to the above main portion of the system: a large-capacity auxiliary storage device 1005, an input device 1006 that is used for the operator to perform input operation, and a display device 1007 that visually informs the operator of the result of program execution. As the input device, a keyboard, a mouse, or a similar device is generally used. As the display device, a CRT display, a printer, or the like is generally used. As the auxiliary storage device 1005, a hard disk unit, a floppy disk unit, or the like is generally used.

A cache memory system 100 is provided in the CPU to achieve a higher rate of processing of the computer system. By using FIG. 5, an example of cache memory embodiment will be explained below.

Figure 5:
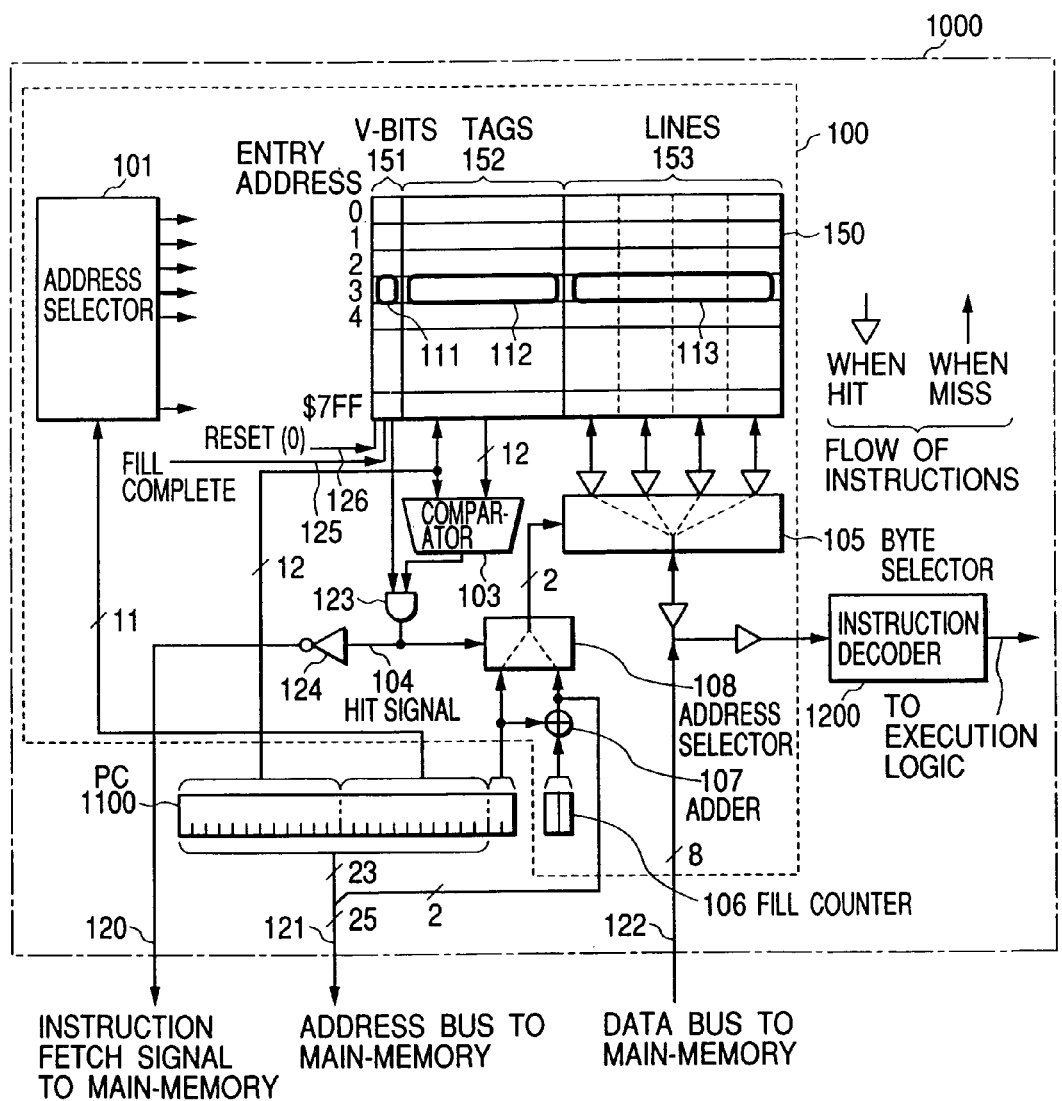
FIG. 5 is a circuit diagram showing a first configuration of cache memory system (by a direct mapping scheme)

FIG. 5 shows the hardware structure of a cache memory system for instructions, configured, according to a scheme called direct mapping, where the cache size is 8192 (8k) bytes and one line consists of four bytes (thus, the entire entry addressing range is $000 to $7FF, where the $ symbol denotes a hexadecimal number). The main storage capacity is assumed to be 32 MB (with an address consisting of 25 bits) with an address being assigned to each byte. Transfer of instructions between the main storage and the CPU is assumed to be performed through the data bus with one byte (8 bits) wide.

The cache memory system 100 in the CPU 1000 has the following components:

Its primary component is a storage means for storing copies of instructions. The storage means consists of V-bits 151, tags 152, and lines 153. The V-bits 151 are a sequence of V-bits as many as the number of entry addresses, each V-bit (valid bit) 111 being associated with each entry address. The tags 152 are a sequence of tags as many as the number of entry addresses, each tag 112 being associated with each entry address. The lines 153 are a sequence of lines as many as the number of entry addresses, each line 113 being associated with each entry address, into which instructions are stored. That is, the lines 153 take the essential function of the cache memory. As the above storage means 150, a faster-access storage element is used.

An address selector circuit 101 receives an entry address input and selects a V-bit 111, tag 112, and line 113 that are designated by the entry address from among the V-bits 151, the tags 152, and the lines 153. The selected V-bit 111, tag 112, and line 113 are to be acted upon during further read/write operation of the cache memory system.

Other components of the cache memory system 100 are: a comparator circuit 103 for comparing tags, a hit signal 104 by which a hit/miss on the cache is judged, a byte selector 105 for selecting a desired byte out of a line, a cache fill counter 106 and an adder 107 that are used when m a miss on the cache occurs, and an address selector 108 for selecting an address to be used by a byte selector 105. These components are connected as shown.

The above components of the cache memory operate as follows.

When the power supply to the system is turned on (or a system reset is performed), a reset signal 126 clears the V-bits in all entry addresses to 0 and the contents of the cache become invalid.

When the CPU 1000 attempts to execute an instruction in the main storage at address A that is specified by a program counter (PC) 1100, a check is performed to see whether the instruction has been copied to the cache memory in a location at an address corresponding to the address A. For this purpose, the 2nd to 12th bits of the PC, representing an entry address, are input to the address selector circuit 101 and a tag 112 and a V-bit 111 of the line having this address are sought. The comparator 103 compares the tag 112 and the upper (13th to 24th) bits of the address A. If a match between both is detected and the associated V-bit is 1 (valid), the hit signal 104 is set at 1 to indicate that the desired copy of the instruction exists in the associated line. In this case, after the line 113 out of the lines 153 is read out, the byte selector 105 selects a desired byte to read, according to the 0th and 1st m bits of the address A. The thus selected byte contains the desired instruction and is input to an instruction decoder 1200 in the CPU and processed for further instruction execution.

If the hit signal 104 is 0, it indicates a miss on the cache. In this case, it is necessary to fetch the instruction from the main storage and copy it to the cache (fill in the location of the cache with the instruction, which will be referred to as filling cache locations hereinafter). Because the procedure of filling cache locations does not influence the implementation of the present invention, its summary only will be described below.

Because the cache memory is composed of lines, when filling cache locations, a set of instructions to be stored per one line (four bytes) including the instruction at address A are copied into the locations of the cache memory, not only the single instruction at the address A. For this purpose, four addresses are serially generated with the upper 23 bits (2nd to 24th bits) identical to those of the address A by using the cache fill counter 106. Access to the main storage is executed through an address bus 121 and the instructions are fetched through a data bus 122. The fetched instructions are distributed by the byte selector 105 to the corresponding bytes in the line of storage and stored (copied) into the bytes. After the above operation is completed, the V-bit 111 of the line is set at 1 by a cache fill complete signal 125. The adder 107 is provided such that the first instruction to be fetched will be the instruction located at the address A of the main storage when the four instructions are sequentially fetched as the cache fill counter 106 changes from 0 to 1, to 2, and to 3. An instruction fetch signal 120 to indicate a miss on the cache, that is, a logical NOT to the hit signal 104 is transmitted to the main storage to notify the main storage that filling cache locations is performed. The cache memory configured as described above can increase the average processing rate of the hardware if the localized operation nature lies in the program in use.

Figure 2:
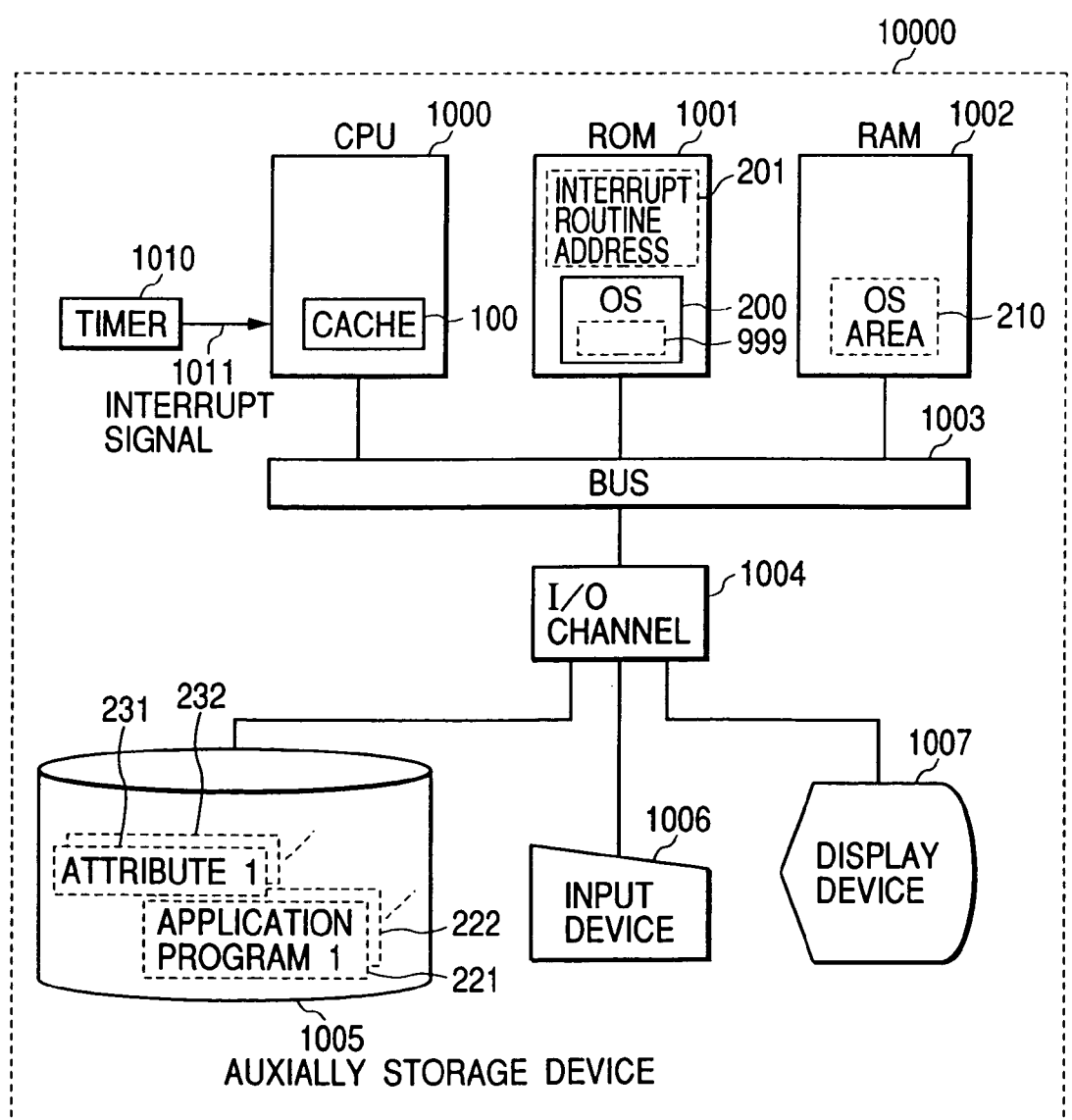
FIG. 2 is a block diagram showing the overall structure of a computer system on which the present invention is to be implemented.

In addition, a timer 1010 is connected to the CPU shown in FIG. 2 and activates an interrupt to the CPU at regular intervals (for example, 10 milliseconds) through a timer interrupt signal line 1011.

To control the operation of the computer system described above, software is prepared as will be describe below.

An operating system (OS) 200 is installed by being loaded into the ROM 1001 to control the operation of the present computer system as a whole, which is not always to be done in this way. The OS is capable of multiprocessing for parallel execution of multiple program units by time sharing, according to a method which will be described below, and includes means of resource allocation 999 for this multiprocessing. In the RAM, an OS area is reserved for the working area for the OS itself to operate and exclusively used by the OS. Of the hardware, the I/O channel 1004 and the auxiliary storage device 1005, the input device 1006, and the output device 1007 connected to the I/O channel are software controlled by the OS.

An interrupt routine address 201 that is the start address of an interrupt processing program within the OS is registered at a specific address in the ROM so that the OS executes predetermined operation in response to an interrupt signal from the timer. When the interrupt signal arrives at the CPU through the timer interrupt signal line 1011, a special circuit (not shown) for interruption in the CPU is activated and causes a jump to the interrupt routine address 201 by referring to this address.

Application programs 221, 222, and so on are stored in the auxiliary storage device 1005 and copied to the RAM 1002 and run if necessary when requested by the operator. The application programs have their attribute information 231, 232, and so on that are required for running the programs and used by the OS. The contents of the attribute information are the size of the program, the start address of program execution, and the required working storage space in memory.

In the computer system described above, the OS operates as illustrated in FIGS. 3 and 4.

Figure 3:
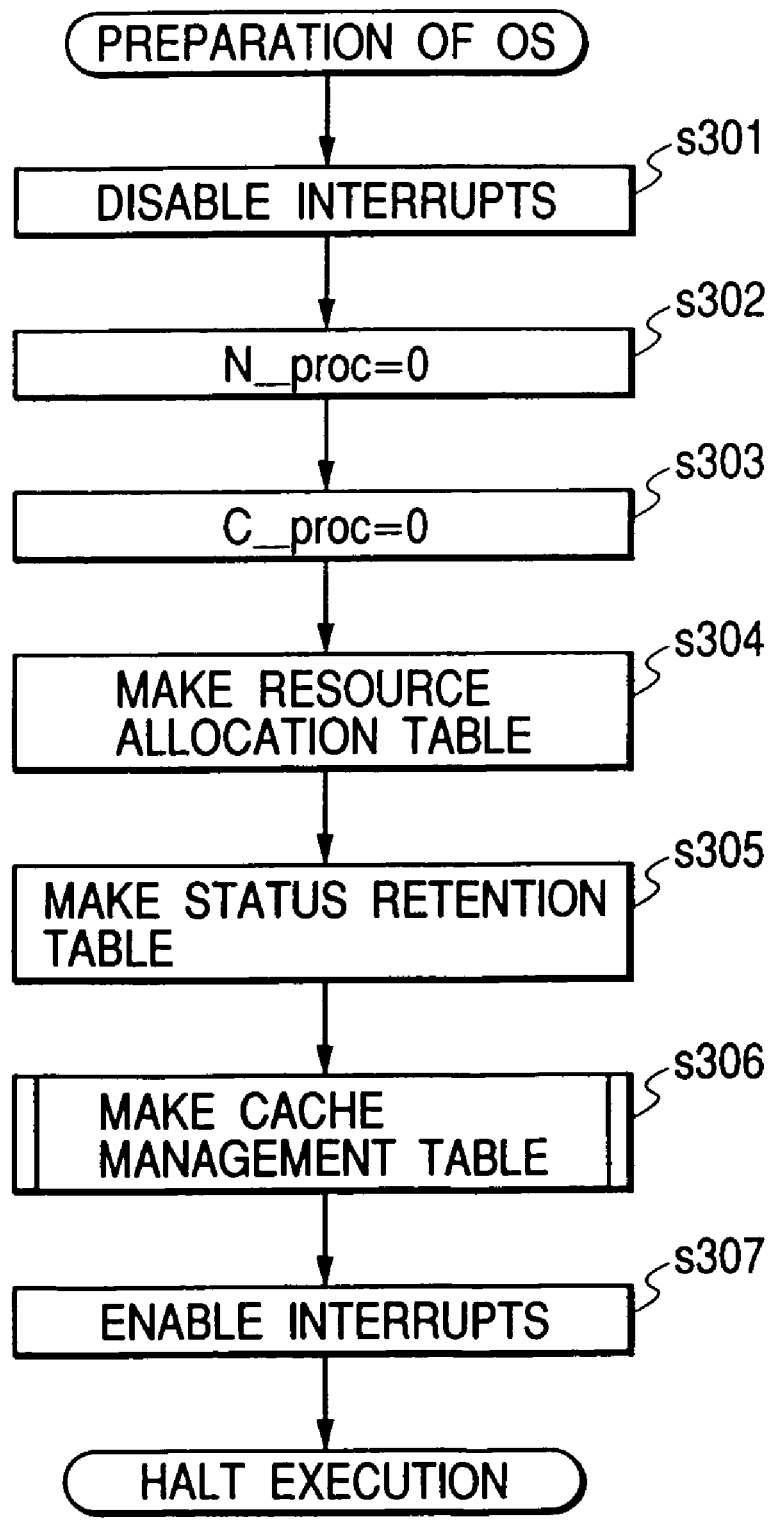
FIG. 3 is a flowchart illustrating the preparation of OS.

Using the flowchart shown in FIG. 3, first, the following discusses the preparation of the OS when the power supply to the system is turned on (or a system reset is performed).

A disable interrupts instruction is issued (step 301, the simplified notation of s301 will be used hereinafter) to prevent an interrupt of the CPU from occurring before the completion of the OS preparation. Next, the storage areas for the following variables and tables are allocated in the OS area 210 and the variables and tables are initialized to predetermined initial values (s302 to s306). The storage area for variable N_proc that represents the number of processes is allocated and the N_proc variable is initialized to 0 (s302). The storage area for variable C_proc that represents the processing number being executed and the C_proc variable is initialized to 0 (s303).

Then, the storage area for a resource allocation table 700 whose form is shown in FIG. 8-*a* is allocated and the table is initialized (s304). Here, process number 0 is assumed to represent the OS itself. Next, the storage area for a status retention table 750 whose form is shown in FIG. 8-*b* is allocated (it is not necessary to initialize this table) (s305). Moreover, the storage area for a cache management table is allocated and the table is initialized (s306). The detail of this table will be described later.

When the above preparation has been completed, interrupts from the timer 1010 are enabled (s307) and the OS execution halts. Thereafter, the OS is activated each time an interrupt occurs.

Then, how the OS operates when an interrupt from the timer occurs will be explained below. A program to be called to execute this operation is stored in area following the interrupt routine address 201.

The operation of the OS to take place when an interrupt occurs is roughly divided into two: first operation is such that the OS runs a specific application program, according to the input from the operator; and second operation is process switching from the ongoing process to another process under the circumstances where multiple program units (processes) are run by time sharing. The detail of the above operations will be explained below, using the flowchart shown in FIG. 4.

When an interrupt occurs, the OS first saves the current CPU status to save area 760 in the status retention table 750 (s311). This saving is executed so that the process that was running immediately before the interrupt occurring can restart in the same status after the completion of the OS operation. Although varying, depending on the type of the CPU, the following are to be saved: a value of PC 752 that indicates the address at which the running process stops by the interrupt, flag status 753 of the CPU, values of registers in the CPU, 754, 755, and so on.

Then, the OS checks the input device 1006 to see whether input from the operator has taken place (s312). According to the result of this check, the OS either carries out further steps (s321 to 327) for the above first operation or does further steps (s331 to s337) for the above second operation.

For the first operation, the OS initially receives the entered name of the application program to run from the input device 1006 (s321). Then, the OS obtains the attribute information 231 for the program from the auxiliary storage device 1005 (s322). Using this information and taking the contents of the above-mentioned tables into account, the OS activates the means of resource allocation 999 to allocate program area and working storage that are resources required to run the program (s323). Furthermore, the OS updates the resource allocation table, according to the allocation done (s324). After the completion of this update, the OS increments by one the N_proc variable that represents the number of processes (s325) and initializes the status retention table for this new process (s326) as follows. The PC value in this table is set at the start address from which the process run starts, that is, the sum of the content of program area start address 703 plus the value of entry address 902 (which will be described later) and other entry fields of the table are initialized to appropriate values (for example, 0).

Finally, the OS loads the program 221 into the main storage at an address determined by the s323 step. It is then possible to run the new process from its initial status next time its turn for run comes. Further processing is as will be done in the second operation that will be described below.

In the above description, the application programs 221, 222, and so on stored in the auxiliary storage device 1005 were assumed to run as single processes.

For the second operation, process switching is performed through steps s331 to s337 which will be detailed below.

The OS first refers to the N_proc variable that represents the number of processes and its operation branches to any of the following (s331). If the N_proc variable is 0, the OS does nothing and halts its execution and then waits for the next interrupt. If the N_proc variable is 1, the OS makes the CPU restore to the same status as saved by retrieving the CPU status from the save area 760 (s332) and starts to run the process with the process number specified by the C_proc variable. If the N_proc variable is 2 or greater, the OS switches the ongoing process whose number is specified by the C_proc variable to the next numbered process by carrying out the following steps s333 to s337.

First, the OS copies the contents of the save area 760 to the area for the next process 770 in the status retention table (s333) and increments by one the process number to run in the C_proc variable (s334). If, however, the value of the C_proc variable becomes greater than the value of the N_proc variable, the process number returns to 1 (s335 and s336).

Then, the OS makes the CPU restore to the same status as saved in the status retention table for the process number specified by the C_proc by retrieving the CPU status from this table (s337) and starts to run the process whose number is specified by the C_proc variable.

The performance of the OS in practical application would be more complex than as described above. For example, a same process may be run two times successively to allow priority execution of a specific process. If contention between multiple concurrent processes to get resources occurs (if, for example, a data file created by process A is used as the input to process B), adjustment is required to force one of the processes to wait. Furthermore, the input from the operator is not only the command to run an application program as illustrated above, but may be, for example, an input of a command to stop the ongoing process. The OS function to handle any possible command input is required. However, because the implementation of the present invention does not depend on the practical performance of the OS, further description of OS performance is not made herein.

In the above description, the cache management table 800 and the means of resource allocation 999 used in the s323 step can be made or configured in several ways, depending on the hardware configuration, which will be detailed in turn below.

As a first embodiment of the present invention, the "direct mapping" configuration of cache memory shown in FIG. 5 will first be discussed.

In this configuration, in order to prevent thrashing, it is advisable to position multiple concurrent processes on the main storage such that the principal parts of the processes do not use any same address on the cache memory. To do this, the following should be carried out: obtain the positions of the principal parts within the application programs from the attribute information 231, 232, and so on of the programs; determine the main storage addresses where the processes (programs) are to be loaded such that the corresponding cache addresses for storing the principal parts, which are determined by using the equation 1, differ from each other.

In this case, the required attribute information is provided in form shown in FIG. 11-a. That is, the attribute information 231 is recorded in this form, containing: program name 900, program size 901, entry address 902, working storage size 903, and in addition, address of principal part 910, and size of principal part 911. The entry address 902 and the address of principal part 910 are addressed in relative bytes from the beginning of the program.

Moreover, the cache management table retains information that each address domain of the cache memory is now occupied by what process or unoccupied in form shown in FIG. 9-a. That is, the cache management table 800 is a mapping table listing cache addresses 810 and process numbers 820 using the cache and mapped in cache address domains. If an address is unoccupied, the associated field of process number 820 contains a value of −1 indicating that no process exists in the address domain. When creating a cache management table (s306) during the preparation of OS, a value of 0 as the process number should be assigned for the address occupied by the OS and a value of −1 for all the remaining addresses. For simplifying purposes, the cache memory addressing domains in FIG. 9-a are fixed in units of 128 ($80) bytes. However, organizing the cache management table 800 can be implemented in some other way; for example, the table may retain variable address domains appropriate for process numbers.

Figure 1:
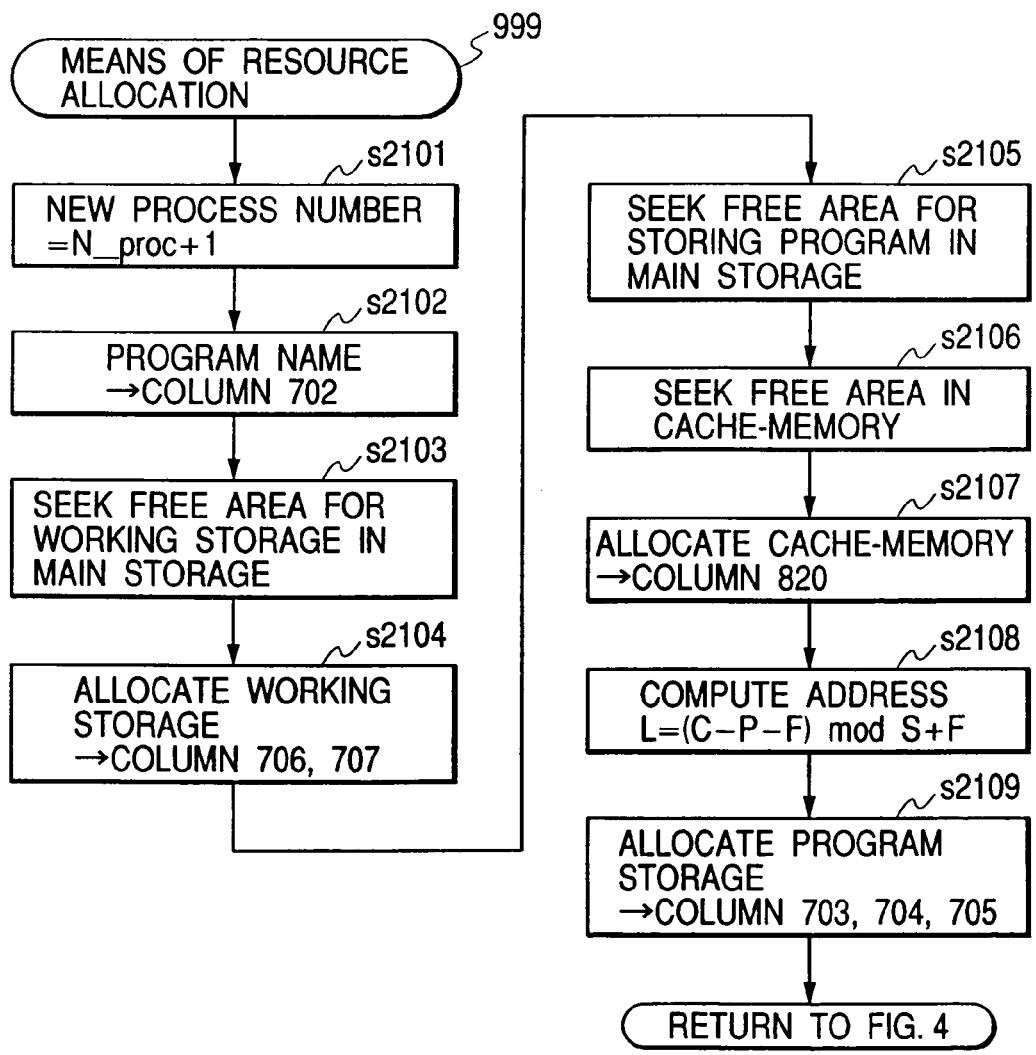
FIG. 1 is a flowchart illustrating the operation of means of resource allocation 999 in a first embodiment of the present invention.

Using the above attribute information and cache management table as well as the above-mentioned resource allocation table 700, the means of resource allocation 999 operates, according to the flowchart shown in FIG. 1.

First, a new process number is set by adding one to the number of processes that are now running; i.e., N_proc+1 (s2101). Further writing into the resource allocation table acts upon the process number N_proc+1. Program name 900 is written into the program name column 702 (s2102). Seeking free area larger than working storage size 903 in the main storage is performed by using the resource allocation table 700 (s2103). The start address of the thus found free area and the start address thereof plus the working storage size−1 are written into the columns 706 and 707 of the resource allocation table, respectively (s2104). Thereby, the working storage is allocated in the main storage.

Seeking free area larger than the sum of program size 901 plus cache size (8 KB) in the main storage is performed by using the resource allocation table 700 (s2105). The reason why the cache size (8 KB) is added is that allowance is provided for shifting the address at which the program is loaded under a later step s2108.

Seeking free area larger than the size of principal part 911 in the cache memory is performed by using the cache management table 800 (s2106). In the cache address column 810 of the cache management table, the address domain from the start address of the free area thus found in the above step s2106 to the end address of the area containing the size of principal part is written. In the associated process number column 820, the process number N_proc+1 is written (s2107). Thereby, the cache memory storage for storing the principal part of the process is allocated.

Address L in the main storage at which the program is loaded is determined, according to the following equation (s2108):

$$L = (C - P - F) \bmod S + F \qquad \text{[Equation 3]}$$

where
  C: Start address of the cache memory area found under s2106
  P: Value of address of principal part 910
  S: Size of cache memory
  F: Start address of free main storage area found under s2105

By this step, the cache memory address domain to be used for the principal part of the program after the program is loaded agrees with the free cache memory area found under the step s2106.

The address L determined through the above step s2108, L+program size−1, and L+entry address are written into the columns 703, 704, and 705 of the resource allocation table, respectively (s2109). Thereby, the program area is allocated in the main storage.

Figure 4:
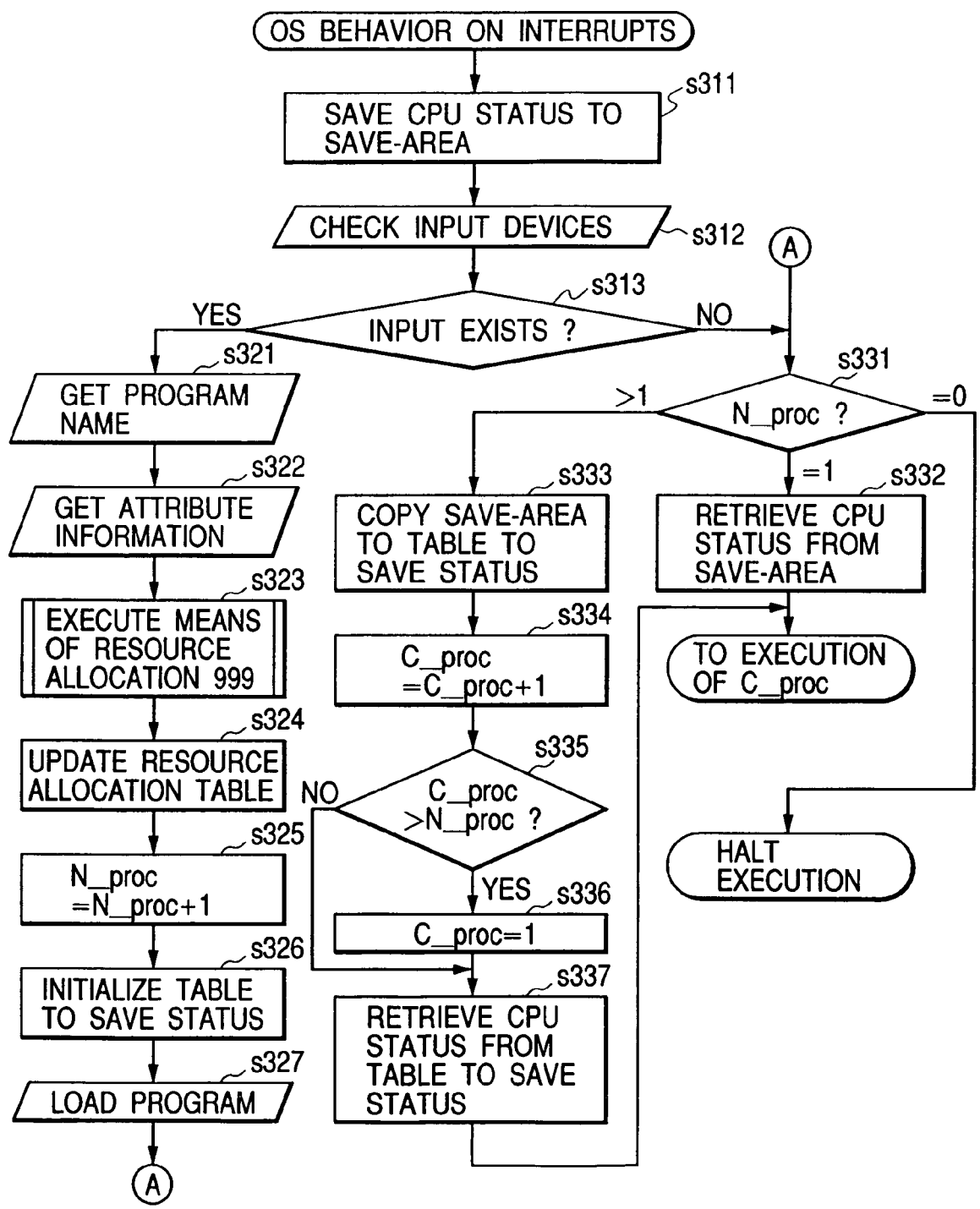
FIG. 4 is a flowchart illustrating the operation of OS by an interrupt occurring from a timer.

The resources required for running the process have been reserved through the above steps, and then the operation of the means of resource allocation 999 terminates and the processing returns to the flowchart of FIG. 4-b.

Figure 6:
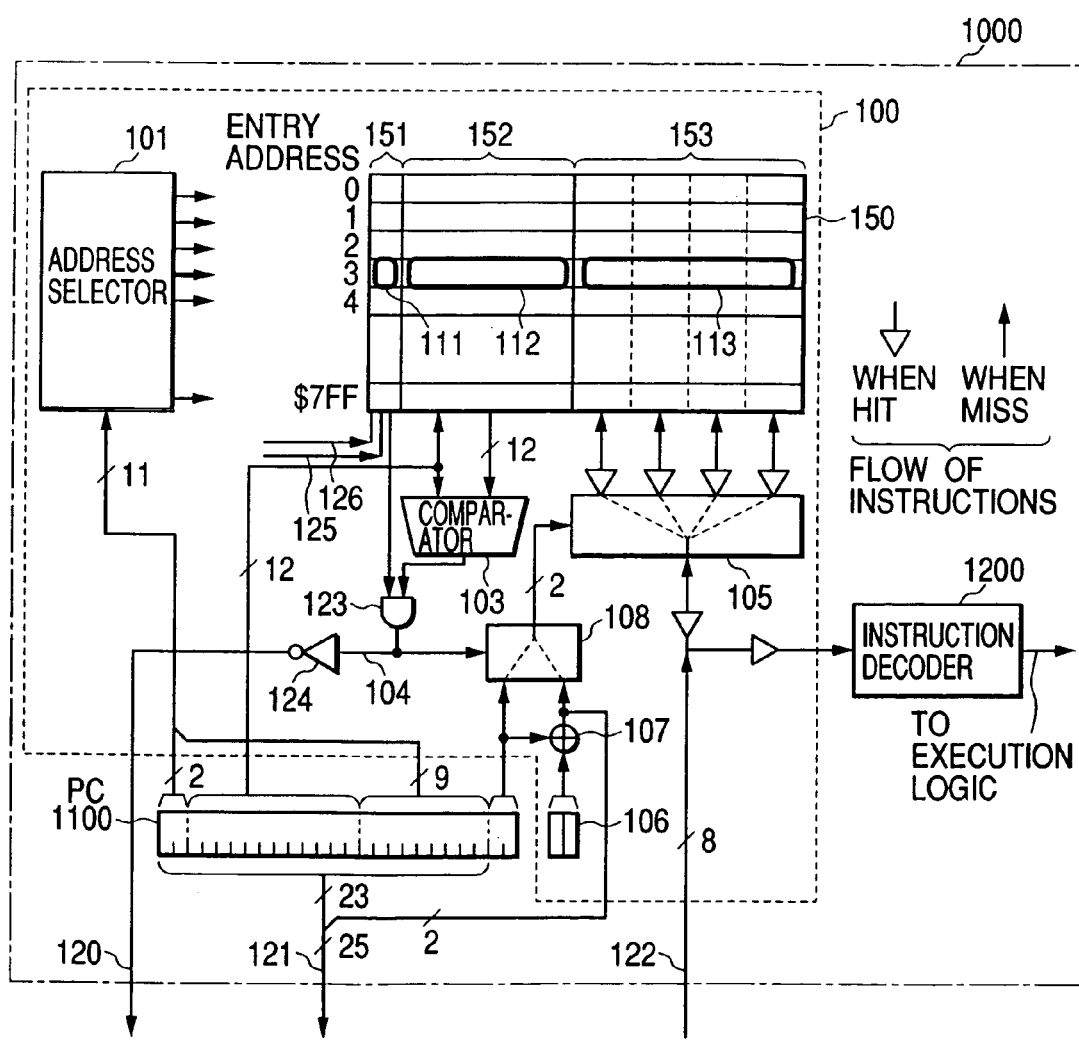
FIG. 6 is a circuit diagram showing a second configuration of cache memory system (by an application space sharing scheme)

Then, a second embodiment of the present invention will be explained below with reference to hardware configuration shown in FIG. 6. FIG. 6 shows an example of cache memory configuration based on a scheme called an "application space sharing scheme," which is a modification to the cache memory configuration shown in FIG. 5.

The components of the cache memory system in FIG. 6 and their operation are the same as those of the system in FIG. 5, but the difference between both lies in the way of generating an entry address. The system in FIG. 5 uses the 2nd to 12th bits of the value of the PC to generate an entry address, whereas the system in FIG. 6 uses the upper LL two bits (the 23rd and 24th bits) as is for the corresponding upper two bits of an entry address. Due to this, the bit positions from where the values are retrieved change, that is, the 11th to 22nd bits (12 bits in total) of the PC, are used, though the number of bits of the tag 112 is unchanged. In the second embodiment, entry addresses are divided into four:

| | |
|---|---|
| $000 to $1FF | Page 0 |
| $200 to $3FF | Page 1 |
| $400 to $5FF | Page 2 |
| $600 to $7FF | Page 3 |

Each page functions as an independent cache memory. The capacity of lines 153, substantial cache memory capacity, is the same for both embodiments in FIG. 5 and FIG. 6.

For the first embodiment in FIG. 5, the relationship between the main storage addresses and the corresponding cache memory addresses is expressed in the above-mentioned equation:

$$A = A \bmod (2^{**}13) \qquad \text{[Equation 1]}$$

For the second embodiment, on the other hand, this relationship is expressed as follows:

$$A = A \bmod (2^{**}11) + \$200 \times (A \div \$800000) \qquad \text{[Equation 4]}$$

where an effective value of division shall be an integral quotient.

The second term of [Equation 4], $200×(A $800000), determines which cache page is to be used for the application program, according to the memory address assigned to the program. In other words, determining a memory (main storage) area to be allocated for an application program is, in effect, assigning a cache memory page to the application program.

In the configuration in FIG. 6, in order to prevent thrashing, it is advisable to position multiple concurrent processes on the main storage such that the processes use different cache memory pages. In this case, the information about the principal parts of the processes is not necessary and the required attribute information is provided in form shown in FIG. 11-b. That is, the attribute information 231 only contains program name 900, program size 901, entry address 902, and working storage size 903 in the simpler form than the corresponding form for the first embodiment shown in FIG. 11-a.

Moreover, the cache management table retains information that each page of the cache memory is now occupied by what process or unoccupied in form shown in FIG. 9-b. That is, the cache management table 800 is a mapping table listing cache pages 811 and process numbers 820 using the cache and mapped in cache pages. If a page is unoccupied, F=the associated field of process number 820 contains a value of −1 indicating that no process exists on the page. When creating a cache management table (s306) during the preparation of OS, a value of 0 as the process number should be assigned for the page occupied by the OS and a value of −1 for all the remaining pages.

Figure 12:
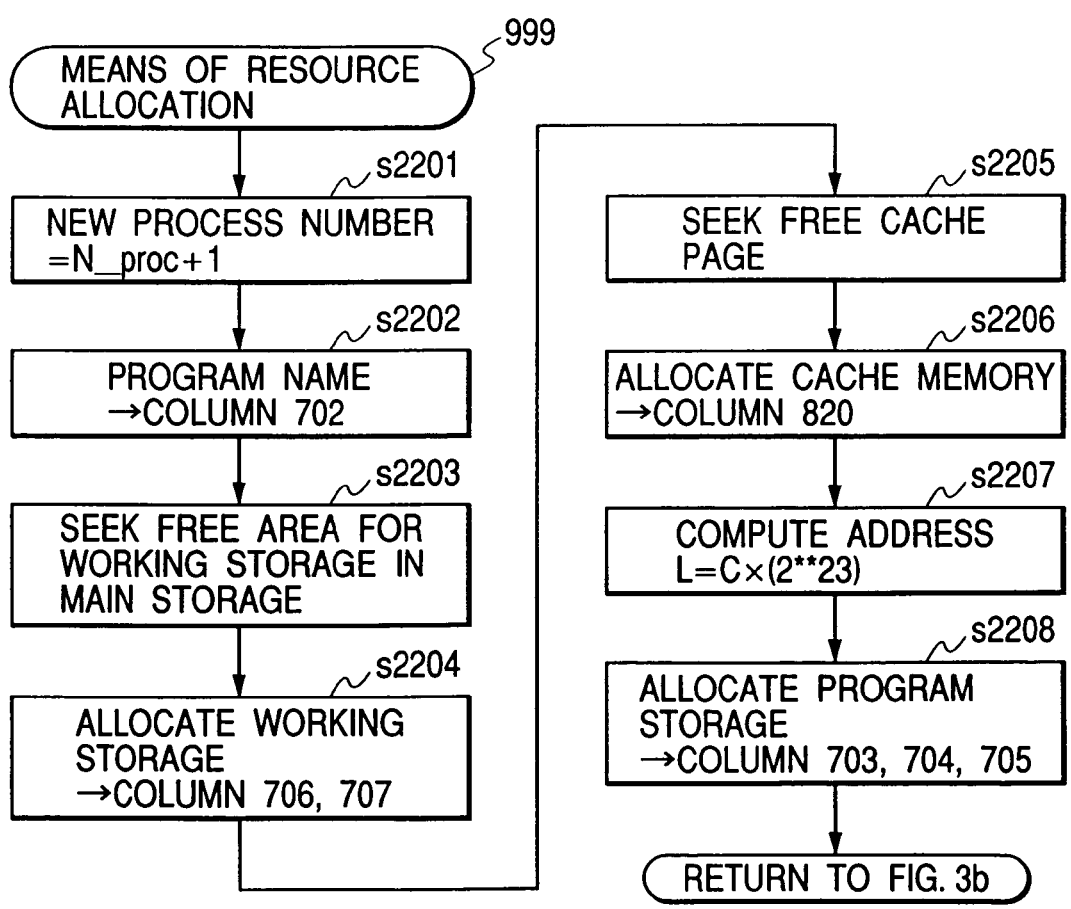
FIG. 12 is a flowchart illustrating the operation of the means of resource allocation 999 in the second embodiment of the invention.

Using the above attribute information and cache management table as well as the above-mentioned resource allocation table 700, the means of resource allocation 999 operates, according to the flowchart shown in FIG. 12.

First, a new process number is set by adding one to the number of processes that are now running; i.e., N_proc+ 1 (s2201). Further writing into the resource allocation table 700 acts upon the process number N_proc+1.

Program name 900 is written into the program name column 702 (s2202). Seeking free area larger than working storage size 903 in the main storage is performed by using the resource allocation table 700 (s2203). The start address of the thus found free area and the start address thereof plus the working storage size−1 are written into the columns 706 and 707 of the resource allocation table, respectively (s2204). Thereby, the working storage is allocated in the main storage.

The above steps s2201 to s2204 are exactly the same as the steps s2101 to s2104 in the first embodiment.

Furthermore, seeking free cache memory page is performed by using the cache management table 800 (s2205) In this table, in the process number column 820 associated with the page thus found under the above step s2250, the process number N_proc+1 is written (s2206). Thereby, the cache memory page for the process is allocated.

Address L in the main storage at which the program is loaded is determined, according to the following equation (s2207):

$$L = C^* (2^{**}23) \qquad \text{[Equation 5]}$$

where

C: Cache memory page number found under s2205

By this step, the cache memory page to be used for the principal part of the program after the program is loaded agrees with the page found under s2205.

The address L determined through the above step s 2207, L+program size−1, and L+entry address are written into the columns 703, 704, and 705 of the resource allocation table, respectively (s2208). Thereby, the program area is allocated in the main storage.

The resources required for running the process have been reserved through the above steps, and then the operation of the means of resource allocation 999 terminates and the processing returns to the flowchart of FIG. 4.

In the second embodiment, two cache memory pages can be allocated for one process. To do this, successive free pages C' and C' +1 must be found in the step s2205. In the step s2207, for example, address L' is determined as the address in the main storage at which the program loaded by using the following equation:

$$L = (C+1)^* (2^{**}23) - (\text{program size} + 2) \qquad \text{[Equation 5]}$$

As a result, the first half of the program uses the cache page C' and the second half thereof uses the cache page C' +1.

However, if one process occupies a plurality of cache pages, then this limits enhancing the processing rates of other processes. When determining whether a plurality of cache pages is allocated for one process, the priority of the process must be considered. For priority consideration, required cache pages 920 (or equivalent priority information) should be registered in advance in the table of attribute information 231. It is advisable to apply the above equation 5' only if there are free cache pages and the process requires a plurality of pages.

In the above description, the size of one cache page has been assumed large enough to be allocated for only a single process at most. Consequently, the numbers of processes that can run concurrently are limited to the number of cache pages, which is not effective. Then, a method for improvement can be developed in combination of the second embodiment with the first embodiment as will be explained below.

Execution priority 930 is registered in advance in the table of attribute information 231 (FIG. 11-*d*). The execution priority is one of the following three levels:

Priority 3 (highest) The process exclusively uses a cache page.

Priority 2 (some priority) The process may share a cache page with other processes. However, the principal part of each process does not share a cache address domain with others.

Priority 1 (ordinary) The process may share a cache page with other processes. There is a possibility that the principal part of each process has the same cache address domain (a risk of thrashing is accepted).

The means of resource allocation 999 refers to the execution priority 930 and executes allocating a free cache page for a process of priority 3 in the method of second embodiment. For a process of priority 2, the means of resource allocation 999 selects a suitable cache page (but, not used for the process of priority 3) if there are no free cache pages and executes cache address domain allocation in the method of first embodiment. For a process of priority 1, the means of resource allocation 999 attempts the method of first embodiment, but loads the process for execution even if cache address domain allocation is impossible.

As the cache management table 800 for implementing the above method, the table shown in FIG. 10 is used. The table shown in FIG. 10, which is a combination of that shown in FIG. 9-*a* and that shown in FIG. 9-*b*, is a two-dimensional table consisting of cache page numbers 811 and cache address domains 810 on each page (relative addressing from the start address of page). In each column field 821 of the table, a process number that uses an address domain of a page is entered. A value of −1 indicates that the domain is unoccupied. An exclusive use field 830 for each page column contains a value indicating whether a process exists that exclusively uses the page. If such process exists, the exclusive use field contains the process number thereof. Contained in the field, a value of −1 indicates that multiple concurrent processes share the page and a value of −2 indicates that the page is not used now at all. When this table is initialized (s306), all exclusive use fields 830 are initialized to −2 and all other fields are initialized to −1. Thereafter, the information for page and address domains used by the OS (process number 0) should be written m into the table.

Figure 7:
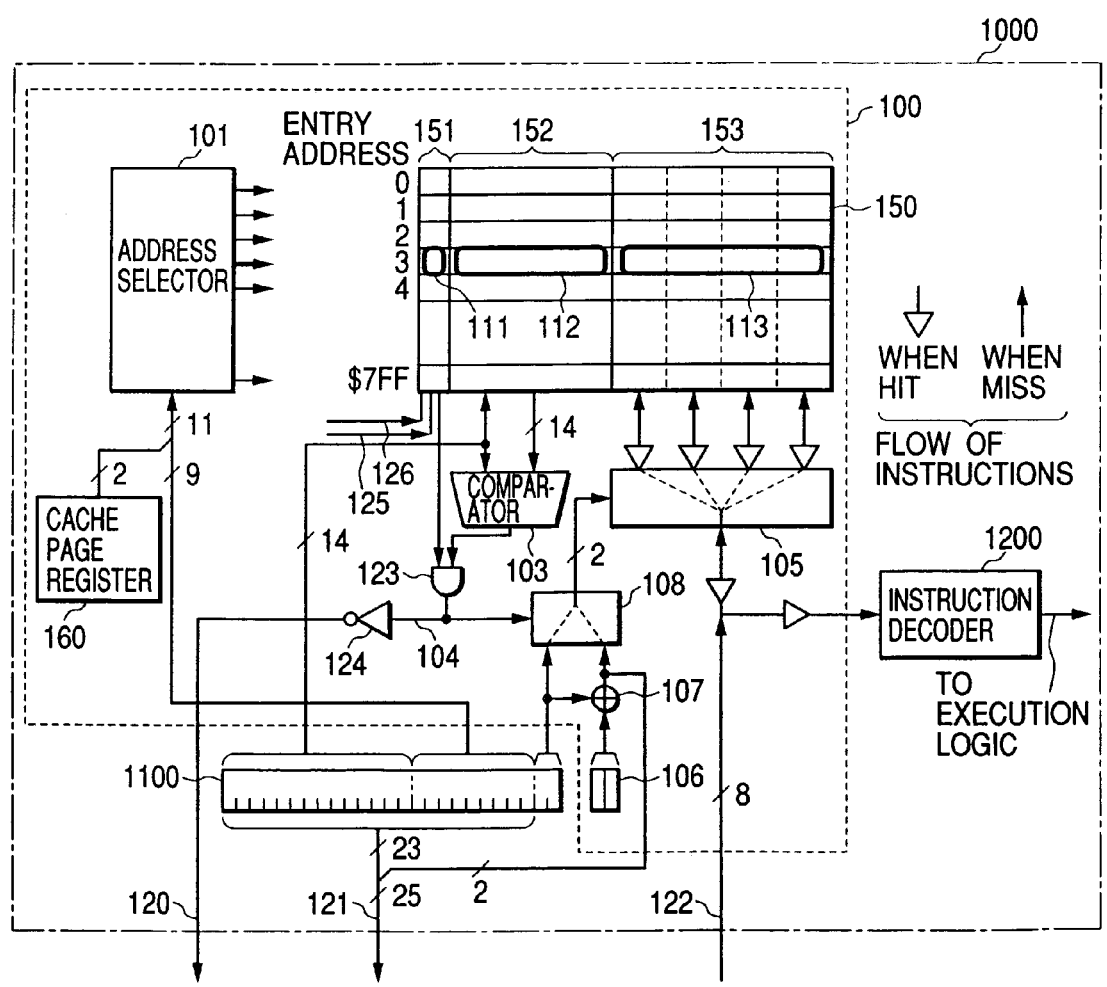
FIG. 7 is a circuit diagram showing a third configuration of cache memory system (by a cache page register scheme)

Furthermore, a third embodiment of the present invention will be explained below with reference to hardware configuration shown in FIG. 7. FIG. 7 shows an example of cache memory configuration based on a scheme called a "cache page register scheme," which is a modification to the cache memory configuration shown in FIG. 5.

The components of the cache memory system in FIG. 7 and their operation are the same as those of the system in FIG. 5, but the difference between both lies in the way of generating an entry address. The system in FIG. 5 uses the 2nd to 12th bits of the value of the PC to generate an entry address, whereas the system in FIG. 7 is provided with a two-bit cache page register 160 and the contents of this register are used as upper two bits of an entry address. The contents of the cache page register are to be software updated by a suitable CPU instruction. Due to this, the tag 112 has additional two bits and the 11th to 24th bits of the PC (14 bits in total) are used.

In the third embodiment, as is the case with the cache shown in FIG. 6, entry addresses are also divided into four:

| | |
|---|---|
| $000 to $1FF | Page 0 |
| $200 to $3FF | Page 1 |
| $400 to $5FF | Page 2 |
| $600 to $7FF | Page 3 |

Figure 14:
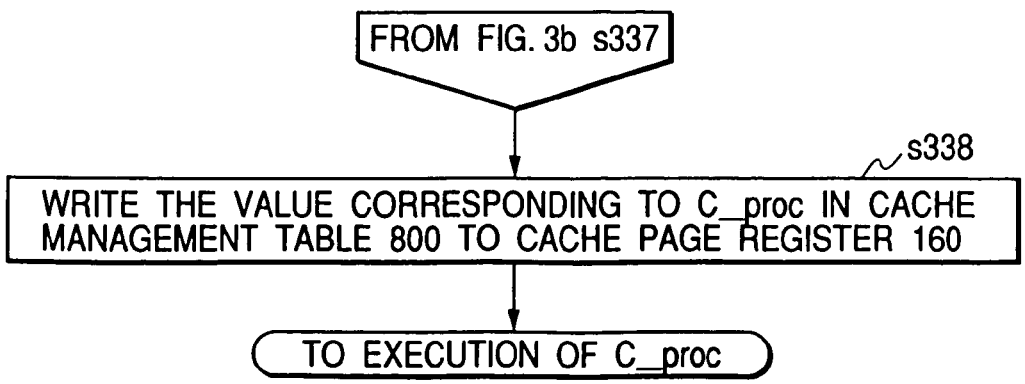
FIG. 14 is a flowchart illustrating an additional step of the OS operation in the third embodiment.

Each page functions as an independent cache memory. Therefore, almost the same thrashing prevention measure as in the second embodiment applies to the third embodiment. Difference between the second and third embodiments lies in the following: change between cache pages automatically occurs, depending on the addressing of a process in the main storage for the cache shown in FIG. 6, whereas the OS must explicitly rewrite the contents of the cache page register in FIG. 7. That is, as shown in FIG. 14, after the step 337 in the process switching procedure in FIG. 4, an additional step (s338) of rewriting the cache page register 160 in accordance with the cache management table 800 is carried out.

The attribute information 231 and the cache management table 800 to be used for the third embodiment are the same as for the second embodiment; i.e., those shown in FIG. 11-*b* and FIG. 9-*b* are used.

Figure 13:
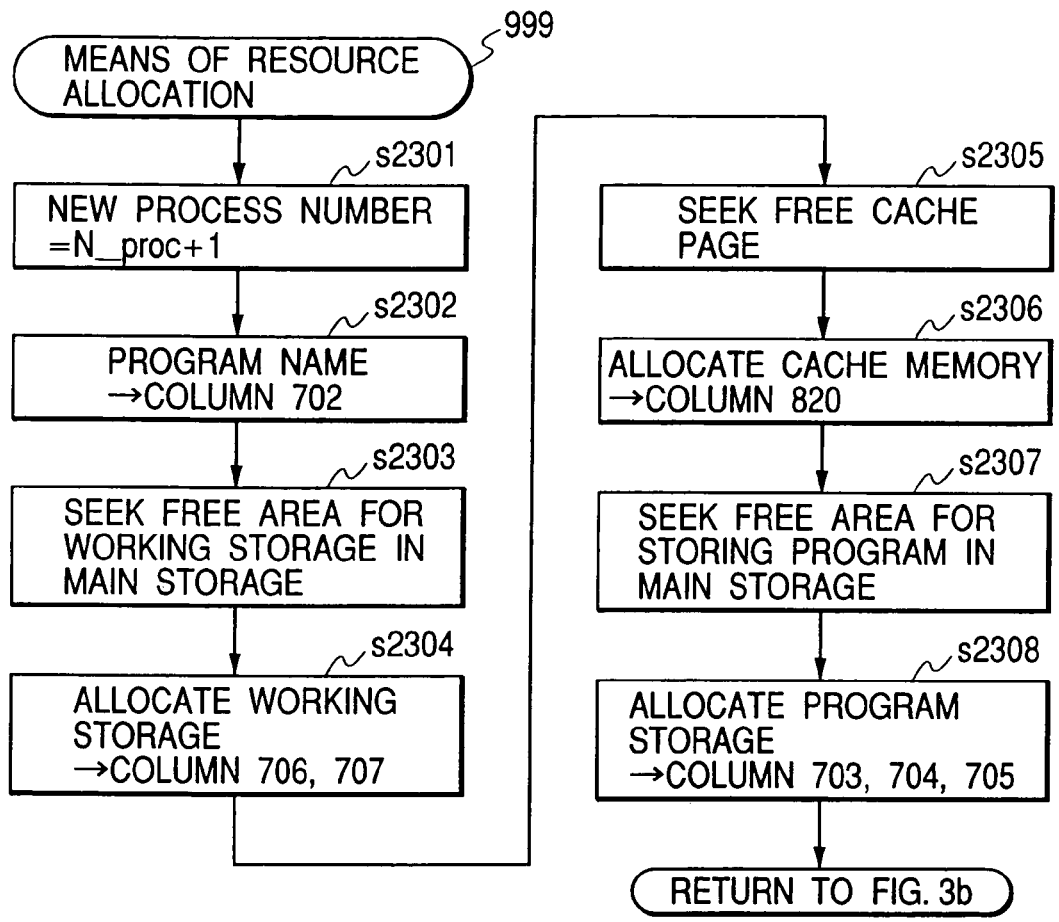
FIG. 13 is a flowchart illustrating the operation of the means of resource allocation 999 in the third embodiment of the invention.

The means of resource allocation 999 operates, according to the flowchart shown in FIG. 13. The steps s2301 to s2308 in FIG. 13 are the same as the steps s2201 to s2280 in FIG. 12 except the step s2307. In the step s2307, address in the main storage at which a program is loaded is determined by seeking free area larger than program size 901 in the main storage through the use of the resource allocation table 700.

The third embodiment can also be combined with the method of first embodiment as the second embodiment can be.

The foregoing discussed the three embodiment models of the present invention.

Although, in these embodiment models, the attribute information 231 has been assumed to be read from the external storage device 1005, it is possible that the OS be directly supplied with parameters as attribute information when being requested to start a process.

Although the foregoing explanation did not discuss how the OS operates in the event that the means of resource allocation 999 fails to allocate resources, the OS shall take suitable action; e.g., it aborts the process start procedure while displaying a message on the display device 1007.

Although the foregoing discussed these embodiment models in which the present invention is applied as part of the OS functionality, it is possible to implement the present invention in such a manner that software developed to work as the embodiment models be added to an existing OS.

In conclusion, the present invention can provide ad multiprocessing environments with the reduced possibility of thrashing occurring, a resource allocation method and OS to execute allocation in this method, making it possible to take full advantage of hardware performance, and a computer system that operates under such OS.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. Method of allocating resources available on a computer system to run a plurality of program units concurrently, comprising:
   a step of receiving a request for running a program unit;
   a step of obtaining parameters that represent attributes of the program unit;
   a step of allocating resources required to run the program unit, based on a resource allocation table and a cache management table as well as the parameters;
   a step of registering results of the allocating resources into the resource allocation table; and
   a step of registering an allocated storage domain of a cache memory to be used for the program unit into the cache management table;
   wherein:
   the parameters give positional information for a principal part to be executed at a high frequency in the program unit;
   the resource allocation table has address reference information on a main storage to be used for program units as well as the program unit;
   the cache management table lists addresses of the cache memory and program units mapped in cache address domains, specifying an address for the program unit; and
   the step of allocating resources determines an address of area to be used for the program unit in the main storage, ensuring that the principal part of the program unit is assigned an entry address of free cache area, based on the positional information for the principal part, the address reference information, and the cache management table.

2. The method of allocating resources according to claim 1, wherein:
   the cache management table lists pages of the cache memory and program units mapped in cache pages, specifying a page or pages for the program unit.

3. An operating system capable of running a plurality of program units concurrently and, when receiving a request for running a new program unit, the operating system carrying out:
   obtaining parameters that represent attributes of the program unit;
   allocating resources required to run the program unit, based on a resource allocation table and a cache management table as well as the parameters;
   registering results of the allocating resources into the resource allocation table; and
   registering an allocated storage domain of a cache memory to be used for the program unit into the cache management table;
   wherein:
   the cache memory has entry address domains, each of which is specified by an entry address;
   the parameters give positional information for a principal part to be executed at a high frequency in the program unit;
   the resource allocation table has address reference information on a main storage to be used for program units;
   the cache management table lists addresses of the cache memory and program units mapped in cache address domains; and
   the allocating resources determines an address of area to be used for the program unit in the main storage, ensuring that an entry address to be assigned for the principal part to be executed at a high frequency in the program unit differs from an entry address assigned for parts to be executed at a high frequency in all program units other than the program unit, based on the positional information for the principal part, the address reference information, and contents of the cache management table.

4. The operating system according to claim 3, wherein:
   the cache memory has a plurality of pages; and
   the cache management table lists pages of the cache memory and program units mapped in cache pages.

5. The operating system according to claim 4, wherein:
   rewriting of a cache page register is performed, according to the contents of the cache management table, when control of execution transfers from the program unit to another program unit.

6. The operating system according to claim 5, wherein:
   the allocating resources includes determining the number of pages of the cache memory to be assigned for the program unit, based on execution priority information that is given by a plurality of the parameters.

7. The operating system according to claim 5, wherein:
   the allocating resources includes determining the number of program units to be mapped for a specific page of the cache memory, based on execution priority information that is given by a plurality of the parameters.

8. The operating system according to claim 4, wherein:
   the allocating resources includes determining the number of pages of the cache memory to be assigned for the program unit, based on execution priority information that is given by a plurality of the parameters.

9. The operating system according to claim 4, wherein:
   the allocating resources includes determining the number of program units to be mapped for a specific page of the cache memory, based on execution priority information that is given by a plurality of the parameters.

10. A computer system including a cache memory, a CPU, and storage:
    the computer system operating under the control of an operating system stored into the storage, and when the computer system receives a request for running a program unit, the operating system carrying out:
    obtaining parameters that represent attributes of the program unit;
    allocating resources required to run the program unit, based on a resource allocation table and a cache management table as well as the parameters;
    registering results of the allocating resources into the resource allocation table; and
    registering an allocated storage domain of a cache memory to be used for the program unit into the cache management table;
    wherein:
    the cache memory has entry address domains, each of which is specified by an entry address;
    the parameters give positional information for a principal part to be executed at a high frequency in the program unit;
    the resource allocation table has address reference information on a main storage to be used for program units;

the cache management table lists addresses of the cache memory and program units mapped in cache address domains; and the allocating resources determines an address of area to be used for the program unit in the main storage, ensuring that an entry address to be assigned for the principal part to be executed at a high frequency in the program unit differs from an entry address assigned for parts to be executed at a high frequency in all program units other than the program unit, based on the positional information for the principal part, the address reference information, and the contents of the cache management table.

11. The computer system according to claim 10, wherein:
the cache memory has a plurality of pages; and
the cache management table lists pages of the cache memory and program units mapped in cache pages.

12. A computer system including a CPU, a cache memory, and storage and capable of running a plurality of program units concurrently:

the computer system having a resource allocation table into which results of allocating resources are registered and a cache management table into which allocated storage domains of the cache memory are registered;

the storage including an area storing an operating system that controls the computer system; and when running one of the plurality of program units, the operating system obtaining parameters for the program unit and allocating resources for the program unit, based on contents of the resource allocation table and the cache management table as well as the parameters;

wherein:

the cache memory has entry address domains, each of which is specified by an entry address;

the parameters give positional information for a principal part to be executed at a high frequency in the program unit;

the resource allocation table has address reference information on a main storage to be used for program units;

the cache management table lists addresses of the cache memory and program units mapped in cache address domains; and the allocating resources determines an address of area to be used for the program unit in the main storage, ensuring that an entry address to be assigned for the principal part to be executed at a high frequency in the program unit differs from an entry address assigned for parts to be executed at a high frequency in all program units other than the program unit, based on the positional information for the principal part, the address reference information, and the contents of the cache management table.

13. The computer system according to claim 12, wherein:
the cache memory has a plurality of pages; and
the cache management table lists pages of the cache memory and program units mapped in cache pages.

* * * * *